United States Patent
Chaganti et al.

(10) Patent No.: US 10,623,265 B1
(45) Date of Patent: Apr. 14, 2020

(54) SYSTEM AND METHOD FOR LOGICAL CONFIGURATION OF DISTRIBUTED SYSTEMS

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/151,227

(22) Filed: Oct. 3, 2018

(51) Int. Cl.
*G06F 15/177* (2006.01)
*H04L 12/24* (2006.01)
*H04L 29/08* (2006.01)

(52) U.S. Cl.
CPC ........ *H04L 41/0893* (2013.01); *H04L 41/046* (2013.01); *H04L 41/0813* (2013.01); *H04L 41/0856* (2013.01); *H04L 67/10* (2013.01); *H04L 41/0886* (2013.01)

(58) Field of Classification Search
CPC .............. H04L 41/0893; H04L 41/046; H04L 41/0813; H04L 41/0856; H04L 41/0886; H04L 67/10
USPC .................................................. 709/220, 224
See application file for complete search history.

(56) References Cited

U.S. PATENT DOCUMENTS

| | | |
|---|---|---|
| 7,222,127 B1 | 5/2007 | Bern et al. |
| 7,516,362 B2 | 4/2009 | Connelly et al. |
| 7,987,353 B2 | 7/2011 | Holdaway et al. |
| 8,386,930 B2 | 2/2013 | Dillenberger et al. |
| 8,401,982 B1 | 3/2013 | Satish et al. |
| 8,583,769 B1 | 11/2013 | Peters et al. |
| 8,868,987 B2 | 10/2014 | Wagner |
| 8,874,892 B1 | 10/2014 | Chan et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,760,529 B1* | 9/2017 | Ho ........................ G06F 9/4806 |
| 9,898,224 B1 | 2/2018 | Marshak et al. |
| 10,057,184 B1 | 8/2018 | Prahlad et al. |
| 10,097,620 B2 | 10/2018 | Reddy et al. |
| 2010/0228915 A1* | 9/2010 | Ogihara ................ G06F 3/0607 711/114 |

(Continued)

*Primary Examiner* — Philip B Tran
(74) *Attorney, Agent, or Firm* — Chamberlain, Hrdlicka, White, Williams & Aughtry

(57) ABSTRACT

A logical configuration manager includes a persistent storage for storing a configuration specification for a distributed system. The logical configuration manager also includes a node configuration generator that makes a first determination that the configuration specification includes a logical portion for the distributed system; in response to the first determination, generates node configurations for nodes of the distributed system based, in part, on the logical portion; and orchestrates application of the node configurations to the nodes of the distributed system. Orchestration of the application of the node configurations to the nodes of the distributed system places the distributed system in a state that complies with the logical portion of the configuration specification.

19 Claims, 12 Drawing Sheets

(56) References Cited

U.S. PATENT DOCUMENTS

| | | | |
|---|---|---|---|
| 2013/0080559 A1* | 3/2013 | Rao | H04L 67/1097 |
| | | | 709/208 |
| 2016/0014039 A1* | 1/2016 | Reddy | H04L 67/38 |
| | | | 709/224 |
| 2017/0317954 A1* | 11/2017 | Masurekar | H04L 45/04 |

* cited by examiner

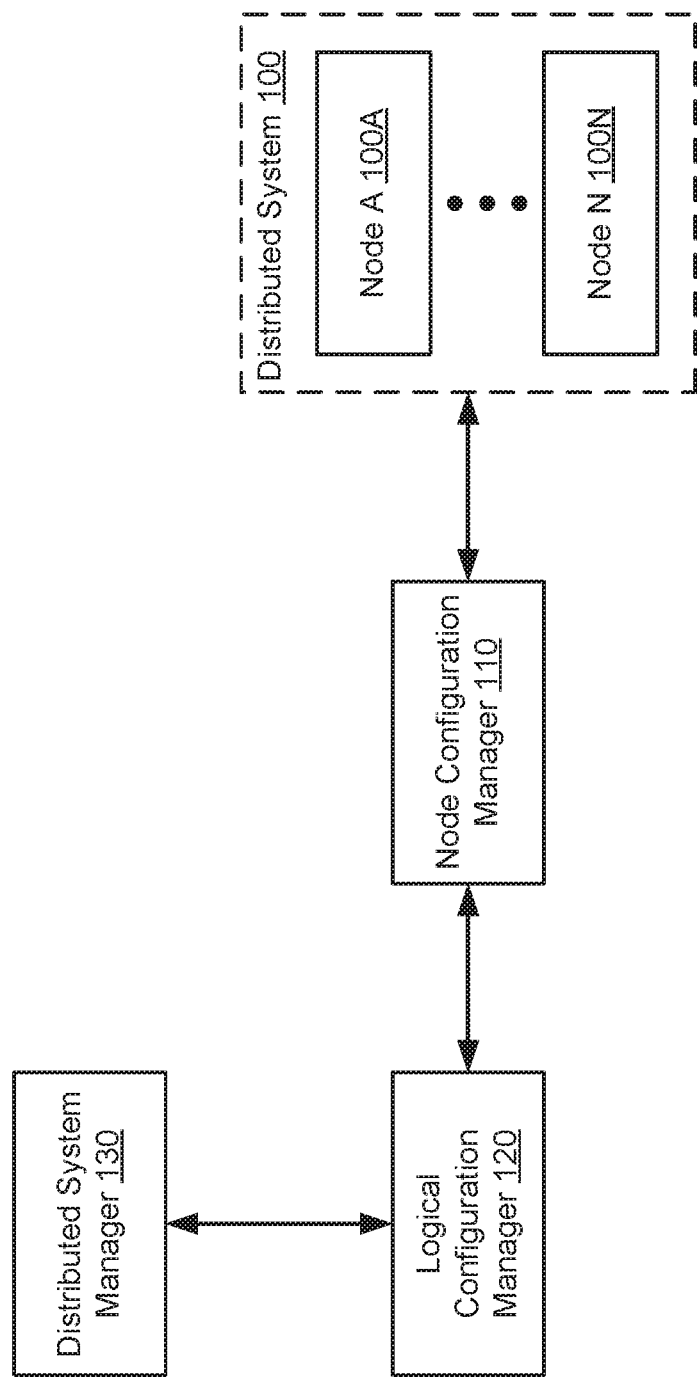
FIG. 1.1

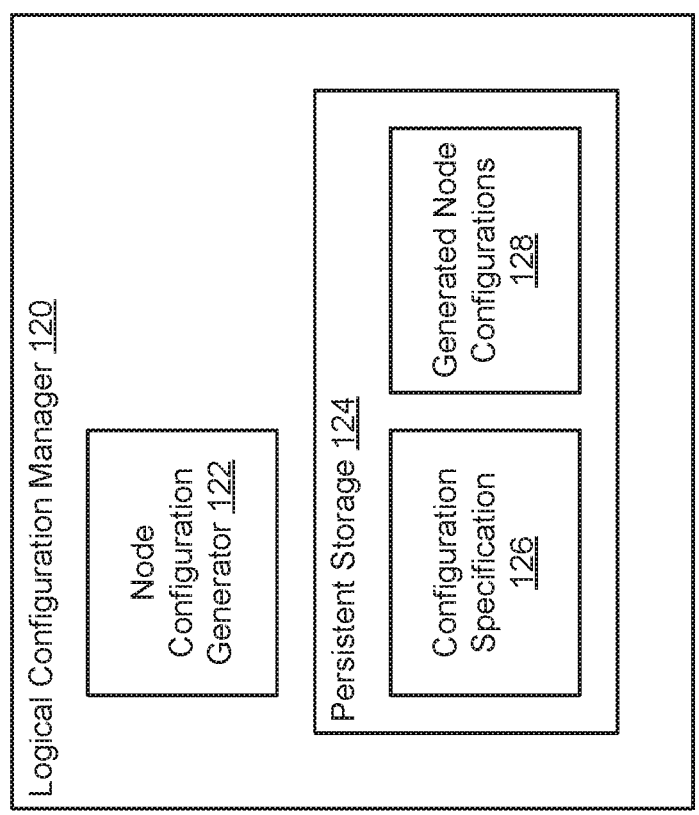
FIG. 1.2

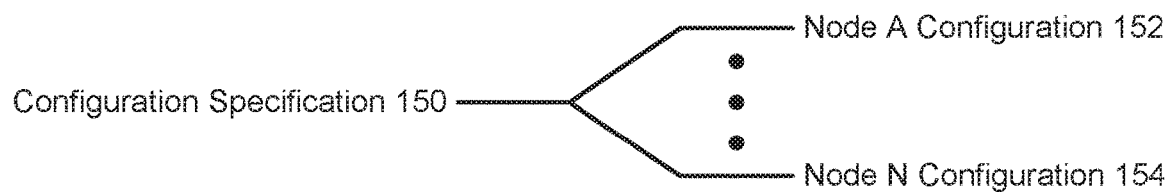
FIG. 1.3
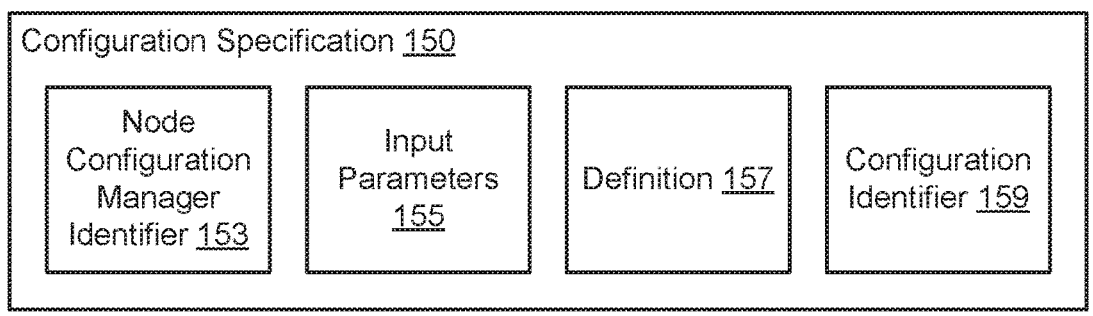
FIG. 1.4
FIG. 1.5
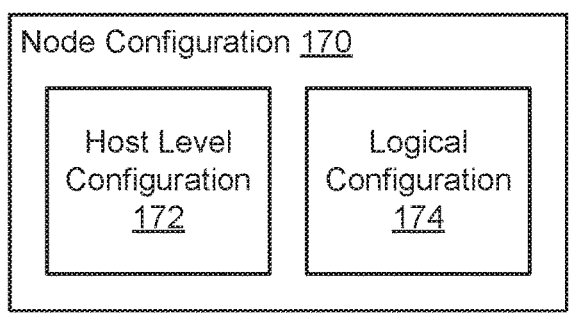
FIG. 1.6

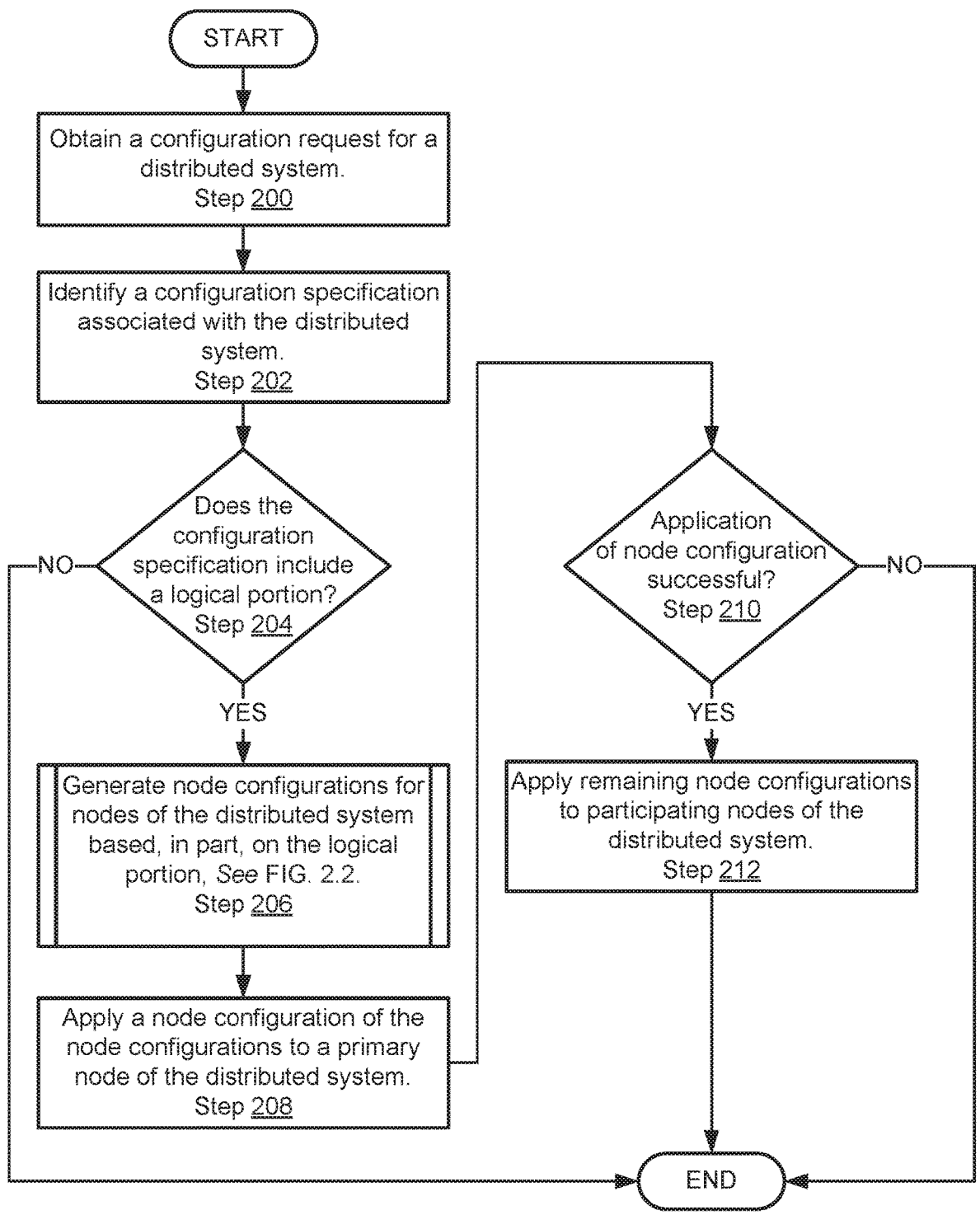
FIG. 2.1

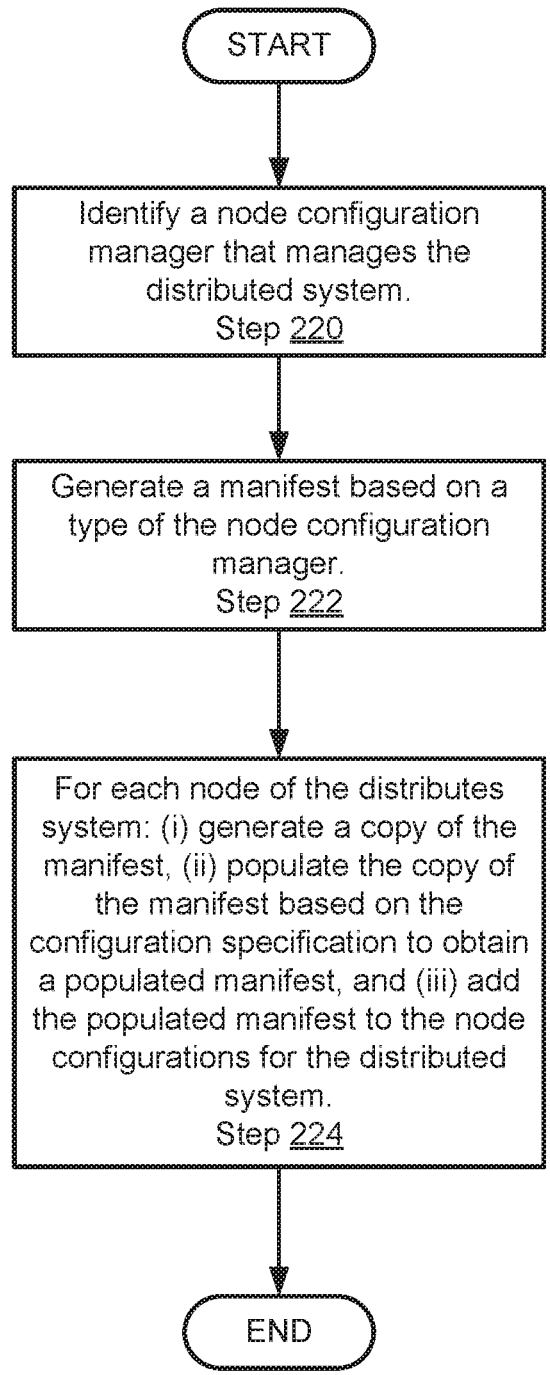
FIG. 2.2

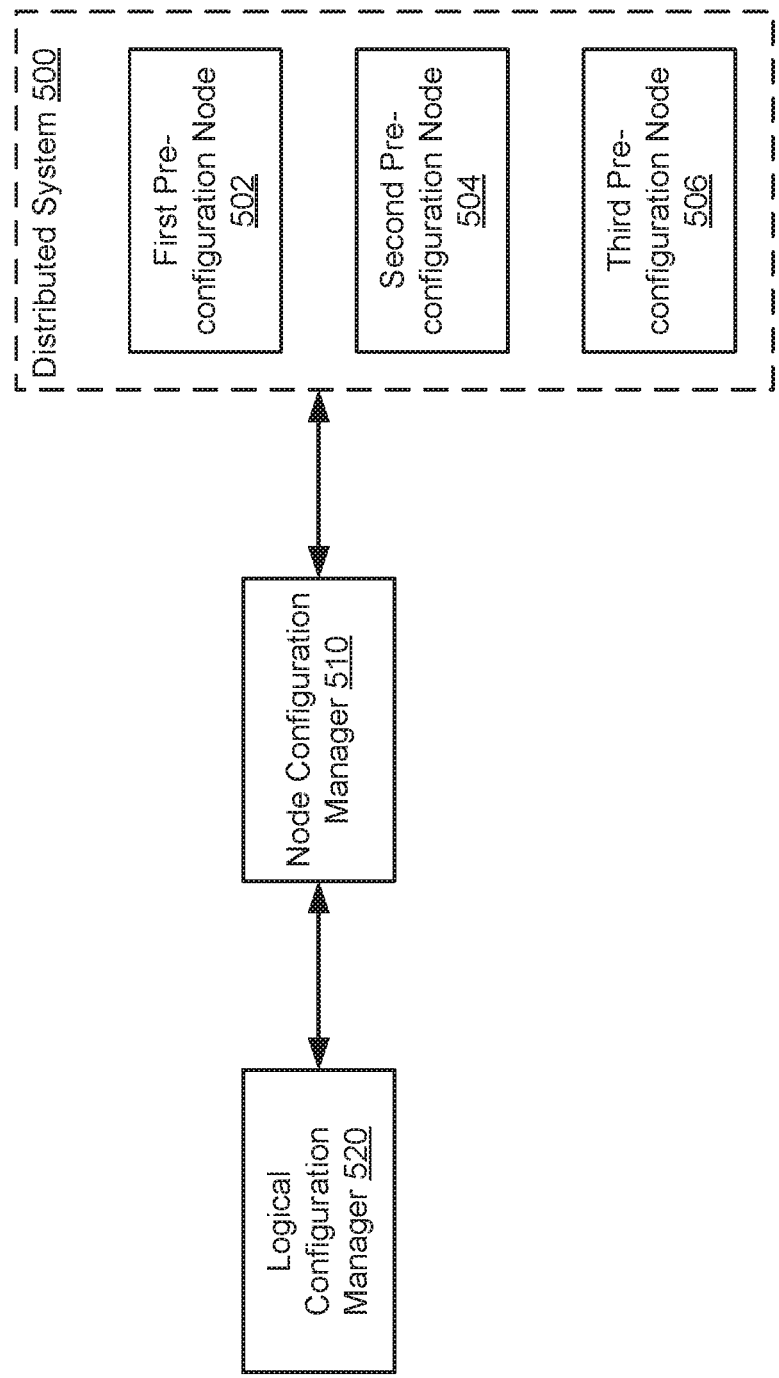
FIG. 5.1

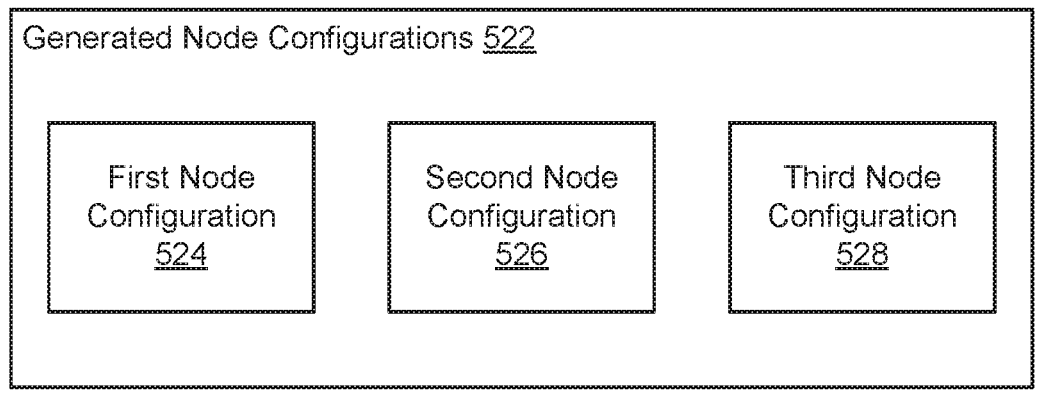
FIG. 5.2

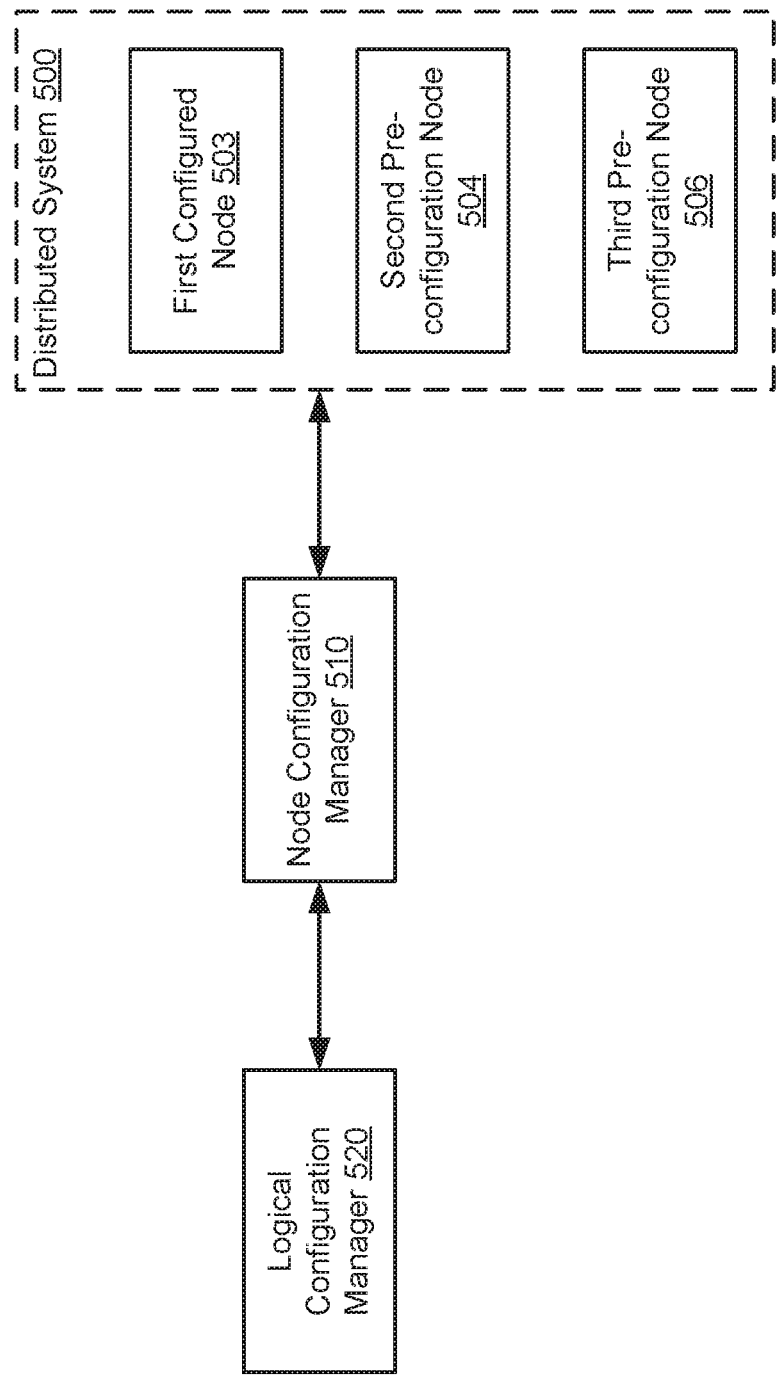
FIG. 5.3

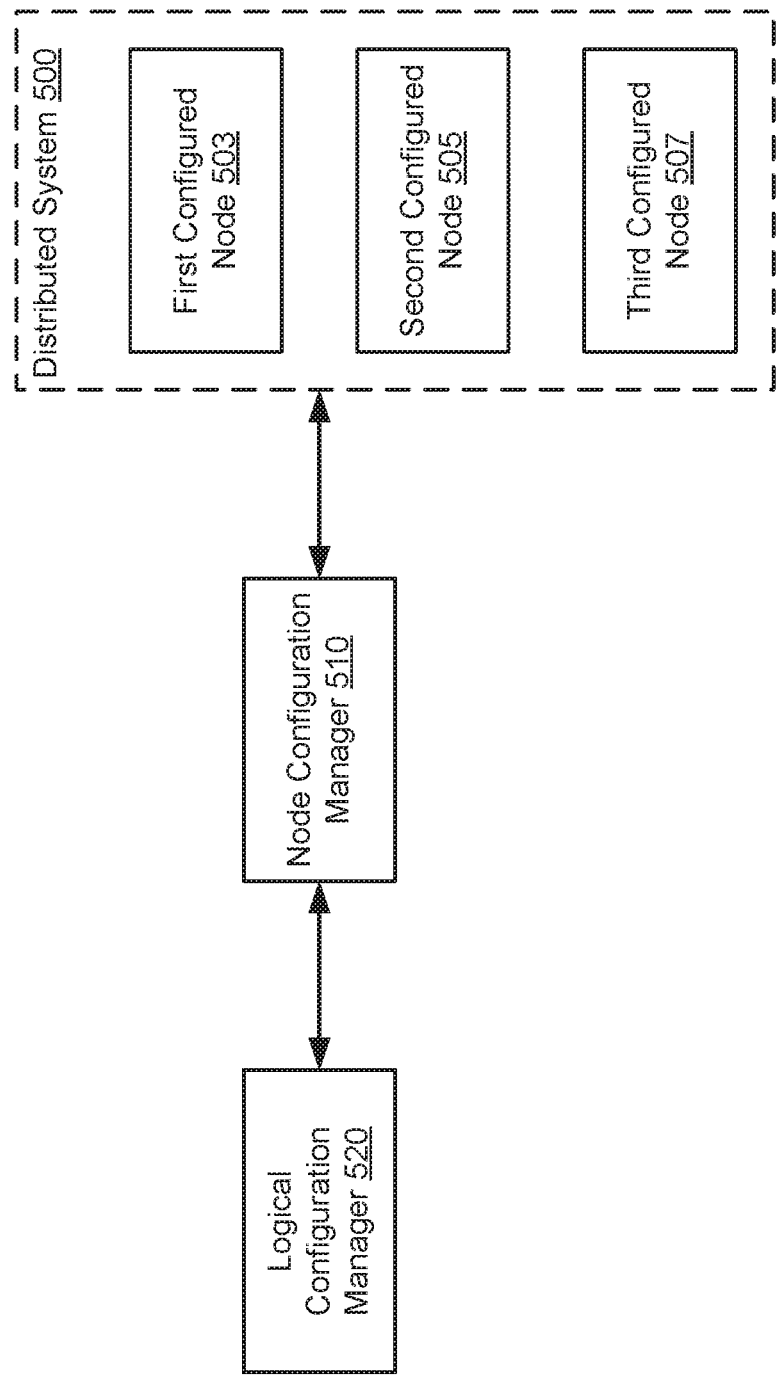
FIG. 5.4

SYSTEM AND METHOD FOR LOGICAL CONFIGURATION OF DISTRIBUTED SYSTEMS

BACKGROUND

Computing devices may provide services to other computing devices. For example, a computing device hosting an application such as a website server may provide services to other computing devices by serving webpages to the other computing devices. The website server may send documents to the other computing devices which, in turn, may be rendered and displayed. The computing devices may be connected by operable connections such as, for example, the Internet.

SUMMARY

In one aspect, a logical configuration manager in accordance with one or more embodiments of the invention includes a persistent storage for storing a configuration specification for a distributed system. The logical configuration manager also includes a node configuration generator that makes a first determination that the configuration specification includes a logical portion for the distributed system; in response to the first determination, generates node configurations for nodes of the distributed system based, in part, on the logical portion; and orchestrates application of the node configurations to the nodes of the distributed system. Orchestration of the application of the node configurations to the nodes of the distributed system places the distributed system in a state that complies with the logical portion of the configuration specification.

In one aspect, a method for configuring a distributed system in accordance with one or more embodiments of the invention includes making a first determination that a configuration specification includes a logical portion for the distributed system; in response to the first determination, generating node configurations for nodes of the distributed system based, in part, on the logical portion; and orchestrating application of the node configurations to the nodes of the distributed system. Orchestrating the application of the node configurations to the nodes of the distributed system places the distributed system in a state that complies with the logical portion of the configuration specification.

In one aspect, a non-transitory computer readable medium in accordance with one or more embodiments of the invention includes computer readable program code, which when executed by a computer processor enables the computer processor to perform a method for configuring a distributed system. The method includes making a first determination that a configuration specification includes a logical portion for the distributed system; in response to the first determination, generating node configurations for nodes of the distributed system based, in part, on the logical portion; and orchestrating application of the node configurations to the nodes of the distributed system. Orchestrating the application of the node configurations to the nodes of the distributed system places the distributed system in a state that complies with the logical portion of the configuration specification.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a logical configuration manager in accordance with one or more embodiments of the invention.

FIG. 1.3 shows a relationship diagram of a relationship between a configuration specification and node configurations in accordance with one or more embodiments of the invention.

FIG. 1.4 shows a relationship diagram of a relationship between a node configuration and a node of a distributed system in accordance with one or more embodiments of the invention.

FIG. 1.5 shows a diagram of a configuration specification in accordance with one or more embodiments of the invention.

FIG. 1.6 shows a relationship diagram of a node configuration in accordance with one or more embodiments of the invention.

FIG. 2.1 shows a flowchart of a method of configuring a distributed system in accordance with one or more embodiments of the invention.

FIG. 2.2 shows a flowchart of a method of generating node configuration in accordance with one or more embodiments of the invention.

FIG. 5.1 shows a diagram of an example system at a first point in time.

FIG. 5.2 shows a diagram of example generated node configurations.

FIG. 5.3 shows a diagram of the example system of FIG. 5.1 at a second point in time.

FIG. 5.4 shows a diagram of the example system of FIG. 5.1 at a third point in time.

DETAILED DESCRIPTION

Figure 3:
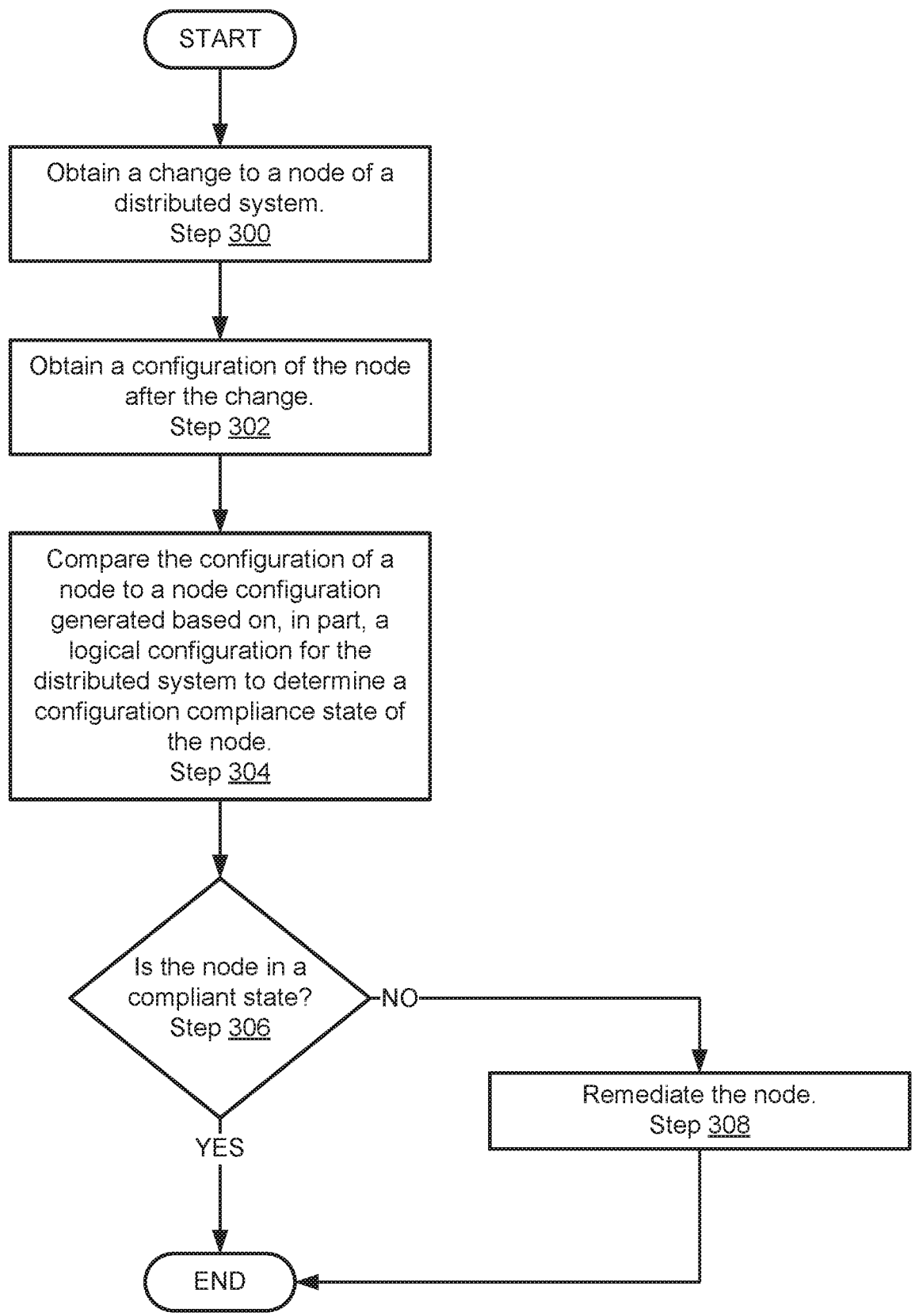
FIG. 3 shows a flowchart of a method of managing a state of a distributed system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for configuring distributed systems. A system in accordance with embodiments of the invention may provide logical configuration services to distributed systems. To provide the logical configuration services to the distributed systems, the system may include a logical configuration manager that generates configurations for nodes of the distributed systems. The logical configuration manager may consider logical entities to be instantiated in the distributed system when generating configurations for the nodes of the distributed system.

In one or more embodiments of the invention, the logical entities are not associated with any of the nodes of the distributed system. Rather, the logical entities may be associated with the distributed system itself rather than its constituent components. For example, the logical entities may exist within a distributed system and may be associated with, e.g., owned, by any entity within the distributed system. Such entities that may own logical entities may be, for example, nodes of the distributed system.

In one or more embodiments of the invention, the logical configuration manager generates configurations that are compatible with a range of node configuration managers that enforce configurations on distributed systems. By doing so, embodiments of the invention may provide a modular system capable of enforcing configurations across nodes of the distributed system using existing hardware and frameworks to extend such frameworks and hardware to support logical configurations rather than mere physical configuration specifications.

FIG. 1.1 shows a diagram of an example system in accordance with one or more embodiments of the invention. The example system may include a distributed system (100). The distributed system (100) may include any number of nodes (100A, 100N). To provide desired functionality, the nodes (100A, 100N) of the distributed system (100) may need to be configured. For example, the nodes (100A, 100N) may be bare-metal nodes. The example system may further include a node configuration manager (110) that enforces configurations on the nodes (100A, 100N) of the distributed system (100), a logical configuration manager (120) that generates configurations for the nodes (100A, 100N), and a distributed system manager (130) that manages the distributed system (100). The distributed system manager (130), or other entities, may provide specifications for the distributed system (100) to the logical configuration manager (120). Each of the components of FIG. 1.1 may be operably connected to the other components, and other entities, by any combination of wired and/or wireless networks. Each component of the system of FIG. 1.1 is discussed below.

The distributed system (100) may be a logical entity that provides services to any number of other entities (not shown). The distributed system (100) may utilize computing resources of any number of nodes (100A, 100N). In one or more embodiments of the invention, the distributed system (100) is implemented as a computing cluster. In such a scenario, the nodes may be computing devices of the computing cluster. The distributed system (100) may be other types of computing systems without departing from the invention.

The nodes (100A, 100N) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 2.1-4. The nodes (100A, 100N) may be other types of computing devices without departing from the invention. For additional details regarding computing devices, refer to FIG. 6.

In one or more embodiments of the invention, the nodes (100A, 100N) include functionality to enable the node configuration manager (110) to configure each node. To provide this functionality, the nodes (100A, 100N) may host agents that may be directed to modify the configuration of the hosting node by the node configuration manager (110). An agent may be a physical or virtualized entity. For example, the agent may be a lifecycle controller or remote access controller when the agent is a physical entity. In another example, the agent may be an application executing using computing resources of a hosting node. Each node may host an agent.

In one or more embodiments of the invention, the agent hosted by each node includes functionality to: (i) modify the bare-metal configuration of the hosting node, (ii) modify an operating system configuration of the hosting node, (iii) modify the networking configuration of the hosting node, (iv) modify the quality of service and/or firewall configuration of the hosting node, and/or (v) instantiate logical entities on the hosting node. The agent may include additional functionality to further modify other characteristics of the nodes without departing from the invention.

A logical entity instantiated by an agent may be, for example, a virtual disk, a virtual machine, an application, and/or administration components to enable the node to cooperatively act with other nodes to provide the functionality of the distributed system (100). The agent may instantiate other logical entities without departing from the invention.

The node configuration manager (110) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the node configuration manager (110) described in this application and/or all, or a portion, of the methods illustrated in FIGS. 2.1-4. The node configuration manager (110) may be other types of computing devices without departing from the invention. For additional details regarding computing devices, refer to FIG. 6.

In one or more embodiments of the invention, the node configuration manager (110) is a virtualized entity. The node configuration manager (110) may use the computing resources of any number of computing devices to provide the functionality of the node configuration manager (110).

In one or more embodiments of the invention, the node configuration manager (110) enforces configurations on nodes (100A, 100N) of the distributed system (100). Additionally, the node configuration manager (110) may monitor the nodes (100A, 100N) for drift detection purposes. For example, after enforcing the configuration on a node, the node configuration manager (110) may continue to monitor the state of the node to determine whether the configuration of the node has changed from the configuration previously enforced on the node.

To provide the aforementioned functions of the node configuration manager (110), the node configuration manager (110) may include functionality to communicate with agents hosted by the nodes. For example, the node configuration manager (110) may send instructions to the agents hosted by the nodes to modify the configuration of the nodes. Similarly, the node configuration manager (110) may receive communications from the agents hosted by the nodes that specify the current configuration, or changes to a configuration, of the nodes. The node configuration manager (110) may report configuration drift of the monitored nodes to the distributed system manager (130) or other entities that manage the distributed system (100).

Additionally, the node configuration manager (110) may include a repository (not shown) to store of configurations for the distributed system (100). As will be discussed in greater detail below, the node configuration manager (110) may receive configurations for the nodes, i.e., node configurations, from the logical configuration manager (120).

While the node configuration manager (110) is illustrated as enforcing configurations on a single distributed system (e.g., 100) in FIG. 1.1, the node configuration manager (110) may manage any number of distributed systems without departing from the invention.

The logical configuration manager (120) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the logical configuration manager (120) described in this application and/or all, or a portion, of the methods illustrated in FIGS. 2.1-4. The logical configuration manager (120) may be other types of computing devices without departing from the invention. For additional details regarding computing devices, refer to FIG. 6.

In one or more embodiments of the invention, the logical configuration manager (120) is a virtualized entity. The logical configuration manager (120) may use the computing resources of any number of computing devices to provide the functionality of the logical configuration manager (120).

In one or more embodiments of the invention, the logical configuration manager (120) generates node configurations for nodes of the distributed system (100). The node configurations may include any number of configurations for modifying the nodes. The logical configuration manager (120) may generate the node configurations based on a configuration specification for the distributed system (100). Once generated, the logical configuration manager (120) may provide the node configurations to the node configuration manager (110) and, thereby, orchestrate configuration of the nodes of the distributed system (100). In this manner, embodiments of the invention may provide for the configuration of any number of nodes to give rise to the distributed system that provides predetermined functionality.

In one or more embodiments of the invention, the logical configuration manager (120) obtains the configuration specification for the distributed system (100) from the distributed system manager (130). For additional details regarding the logical configuration manager (120), refer to FIG. 1.2.

While the logical configuration manager (120) is illustrated as providing services to a single node configuration manager (e.g., 110) in FIG. 1.1, the logical configuration manager (120) may provide services to any number of entities without departing from the invention. For example, the logical configuration manager (120) may be used to partition and configure any nodes of a computing cluster into any number of distributed systems.

The distributed system manager (130) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the distributed system manager (130) described in this application and/or all, or a portion, of the methods illustrated in FIGS. 2.1-4. The distributed system manager (130) may be other types of computing devices without departing from the invention. For additional details regarding computing devices, refer to FIG. 6.

In one or more embodiments of the invention, the distributed system manager (130) is a virtualized entity. The distributed system manager (130) may use the computing resources of any number of computing devices to provide the functionality of the distributed system manager (130).

In one or more embodiments of the invention, the distributed system manager (130) manages the distributed system (100). To manage the distributed system (100), the distributed system manager (130) may send a configuration specification for the distributed system (100) to the logical configuration manager (120) to configure the nodes of the distributed system (100).

For example, in a scenario in which the nodes of the distributed system have recently been purchased and installed in a new physical location, the nodes may not be configured. Consequently, in such a state the distributed system (100) may be unable to provide its functionality. To remedy this state, the distributed system manager (130) may initiate configuration of the distributed system (100) by sending the configuration specification to the logical configuration manager (120).

In one or more embodiments of the invention, the distributed system manager (130) monitors the distributed system (100) for configuration drift. If the distributed system manager (130) detects configuration drift, the distributed system manager (130) may take remedial action to correct the distributed system (100). For example, the distributed system manager (130) may send instructions to the logical configuration manager (120) or the node configuration manager (110) to enforce a configuration on any of the nodes of the distributed system (100).

The system illustrated in FIG. 1.1 may provide the ability to enforce a logical configuration on the nodes of the distributed system (100). The logical configuration may include any number of virtualized entities. In a scenario in which a node becomes inoperable, the system of FIG. 1.1 may automatically ensure that virtualized entities hosted by the now-inoperable node are instantiated on other nodes to ensure that the logical configuration of the distributed system (100) is maintained.

As discussed above, the system of FIG. 1.1 may include a logical configuration manager that generates node configurations. FIG. 1.2 shows a diagram of the logical configuration manager (120) in accordance with embodiments of the invention. To provide the above noted functionality of the logical configuration manager (120), the logical configuration manager (120) may include a node configuration generator (122) and a persistent storage (124). Each component of the logical configuration manager (120) is discussed below.

In one or more embodiments of the invention, the node configuration generator (122) is a hardware device including circuitry. The node configuration generator (122) may be, for example, a digital signal processor, a field programmable gate array, or an application specific integrated circuit. The node configuration generator (122) may be other types of hardware devices without departing from the invention.

In one or more embodiments of the invention, the node configuration generator (122) is implemented as computing code stored on a persistent storage that, when executed by a processor, performs the functionality of the node configuration generator (122). The processor may be a hardware processor including circuitry such as, for example, a central processing unit or a microcontroller. The processor may be other types of hardware devices for processing digital information without departing from the invention.

In one or more embodiments of the invention, the node configuration generator (122) generates node configurations based on a configuration specification (126). For additional details regarding a configuration specification (126), refer to FIG. 1.5. For additional details regarding generated node configurations (128), refer to FIG. 1.6. To generate node configurations, the node configuration generator (122) may perform all, or a portion, of the methods illustrated in FIGS. 2.1-4.

In one or more embodiments of the invention, the persistent storage (124) is a storage device that stores data structures. The persistent storage (124) may be a physical or logical device. For example, the persistent storage (124) may include hard disk drives, solid state drives, tape drives, and/or other components to provide data storage functionality. Alternatively, the persistent storage (124) may be a logical device that utilizes the physical computing resources of other components to provide data storage functionality.

In one or more embodiments of the invention, the persistent storage (124) stores the configuration specification (126) and the generated node configurations (128). Each of these data structures is discussed below.

In one or more embodiments of the invention, the configuration specification (126) includes information regarding a logical configuration of a distributed system. For example, the logical configuration of the distributed system may include any number of virtualized entities, logical relationships between nodes of the distributed system, and/or other characteristics of the distributed system. For additional details regarding the configuration specification (126), refer to FIG. 1.5.

In one or more embodiments of the invention, the generated node configurations (128) include configurations for the nodes of the distributed system. The configurations for the nodes of the distributed system may give rise to the logical configuration specified by the configuration specification (126) when the node configurations are applied to nodes of a distributed system.

To further clarify relationships of the system of FIG. 1.1, FIGS. 1.3-1.4 show relationship diagrams illustrating relationships of the system of FIG. 1.1.

FIG. 1.3 shows a first relationship diagram that illustrates the relationship between a configuration specification (150) and node configurations (152, 154) in accordance with one or more embodiments of the invention. As seen from FIG. 1.3, there is a 1-N relationship between a configuration specification (150) and node configurations (152, 154). For example, when node configurations for a distributed system are generated based on a configuration specification, any number of node configurations may be generated.

FIG. 1.4 shows a second relationship diagram that illustrates relationship between a node configuration (160) and the node (162) in accordance with one or more embodiments of the invention. As seen from FIG. 1.4, there is a 1-1 relationship between node configurations (e.g., 160) and nodes (162). For example, when node configurations are generated for distributed system, one node configuration may be generated for each respective node.

As discussed above, a logical configuration manager may utilize data structures and generating node configurations. FIGS. 1.5-1.6 illustrate data structures that may be used when generating node configurations.

FIG. 1.5 shows a diagram of a configuration specification (150) in accordance with one or more embodiments of the invention. The configuration specification (150) may include a node configuration manager identifier (153), input parameters (155), definitions (157), and/or a configuration identifier (159).

The node configuration manager identifier (153) may be an identifier of a node configuration manager that manages a distributed system to which the configuration specification (150) applies. The identifier may be, for example, a uniform resource locator, a name, network identification information, or any other type of information that may be used to identify the node configuration manager.

The input parameters (155) may be parameters that are set at the time of configuration. For example, the input parameters (155) include a name for the distributed system to which the configuration specification (150) applies, the number of nodes of the distributed system, or another characteristic of the distributed system that may be helpful to specify at configuration time. These input parameters (155) may be used to generate the node configurations.

The definitions (157) may specify the logical configuration of the distributed system. For example, the logical configuration may include the name of the distributed system, number of nodes in the distributed system, or other characteristics of the distributed system. The definitions (157) may be populated, in part, based on the input parameters (155).

The configuration identifier (159) may be an identifier used to identify a set of node configurations applicable to a distributed system. For example, the configuration identifier (159) may be used to discriminate node configurations for a distributed system associated with the configuration specification (150) from other node configurations for other distributed systems.

FIG. 1.6 shows a diagram of a node configuration (170) in accordance with one or more embodiments of the invention. The node configuration (170) includes a host level configuration (172) and a logical configuration (174).

The host level configuration (172) may include configurations that are associated with a node rather than the distributed system. For example, when generating a node configuration, certain configurations may be included based on an identity of a node. For example, the node may have a specific hardware profile. The host level configuration (172) includes configurations that are specific to the node only.

The logical configuration (174) may include configurations that are associated with a distributed system. The logical configuration (174) may not be associated with any nodes of the distributed system. For example, the logical configuration (174) may specify a configuration for generation of a virtualized storage that uses 10% of the storage capacity of each node of the distributed system. Thus, when applied to a node, the logical configuration (174) may be applied if a logical entity of a distributed system does not already exist within the distributed system.

The data structures illustrated in FIGS. 1.5-1.6 may be stored in any format, include additional information, include less information, include different information, and/or be spanned across any number of devices without departing from the invention. Further, any of these data structures may be stored in other locations and may be replicated as necessary throughout the system of FIG. 1.1 without departing from the invention.

As discussed above, a logical configuration manager may orchestrate configuration of a distributed system. FIGS. 2.1-2.2 show methods in accordance with one or more embodiments of the invention that may be performed by components of the system of FIG. 1.1.

FIG. 2.1 shows a flowchart of a method in accordance with one or more embodiments of the invention. The method depicted in FIG. 2.1 may be used to configure nodes of a distributed system in accordance with one or more embodiments of the invention. The method shown in FIG. 2.1 may be performed by, for example, a logical configuration manager (e.g., 120, FIG. 1.1). Other components of the system illustrated in FIG. 1.1 may perform the method of FIG. 2.1 without departing from the invention.

In step 200, a configuration request or a distributed system is obtained.

The configuration request may be obtained from, for example, the distributed system, an administrator of the distributed system, a manager of the distributed system, or another entity. In one or more embodiments of the invention, the configuration request may include an identifier of the distributed system. The identifier may be, for example, the name of the distributed system. Other identifiers may be used without departing from the invention.

In step 202, a configuration specification associated with the distributed system is identified.

In one or more embodiments of the invention, the configuration specification specifies a logical configuration for the distributed system. For example, the logical configuration may specify any number of virtualized resources and/or virtualized entities to be hosted by the distributed system. The logical configuration may not be associated with any of the nodes of the distributed system. Rather, the logical configuration may be associated with the distributed system.

In one or more embodiments of the invention, the configuration specification is identified based on an identifier of the distributed system obtained in step 200. The configuration specification may be stored in a logical configuration manager or another entity.

In step 204, it is determined whether the configuration specification includes a logical portion.

For example, in some embodiments of the invention, a configuration specification may include node level configurations and logical configurations. The node level configurations may be associated with nodes of the distributed system while the logical configurations may be associated with the distributed system and may not be associated with any particular node of the distributed system.

If the configuration specification includes a logical portion, the method may proceed to step 206. If the logical configuration does not include the logical portion, the method may end.

In step 206 node configurations for nodes of the distributed system are generated based, in part, on the logical portion of the configuration specification.

In one or more embodiments of the invention, a node configuration is generated for each node in the distributed system. In other words, the number of node configurations generated is the same as the number of nodes in the distributed system. In other embodiments of the invention, different numbers of node configurations may be generated. For example, more node configurations may be generated in a scenario in which it is anticipated that additional nodes will be added to the distributed system. In another example, fewer node configurations may be generated in a scenario in which one of the node configurations may be applied to multiple nodes of the distributed system.

In one or more embodiments of the invention, each of the generated node configurations includes a portion that gives rise to a logical entity hosted by the distributed system. For example, the logical entity may be a virtualized resource, a virtual machine, an application, or another type of virtual entity.

In one or more embodiments of the invention, the node configurations are generated via the method illustrated in FIG. 2.2. The node configurations may be generated the other methods without departing from the invention.

In step 208, a node configuration of the node configurations is applied to a primary node of the distributed system.

In one or more embodiments of the invention, the primary node is a first node to which any of the node configurations is applied. The primary node may be selected from the nodes of the distributed system using any criteria.

In one or more embodiments of the invention, applying the node configuration to the primary node of the distributed system fails. For example, the primary node may be in an inoperable state which prevents the node configuration from being applied to the primary node. The primary node may be in an inoperable state because a storage of the primary node is inoperable. The primary node may be in an inoperable state for other reasons without departing from the invention.

In one or more embodiments of the invention, applying the node configuration to the primary node is accomplished by sending the node configurations to a node configuration manager associated with the distributed system. In turn, the node configuration manager may apply the node configurations to the nodes of the distributed system. If the application of the node configuration to the primary node fails, the node configuration manager may notify the logical configuration manager and/or other entities such as, for example, the distributed system manager.

In step 210, it is determined whether application of the node configuration to the primary node was successful. If application of the node configuration to the primary node was successful, the method may proceed to step 212. If application of the node configuration to the primary node was not successful, the method may end following step 210.

In step 212, the remaining node configurations are applied to participating nodes of the distributed system.

In one or more embodiments of the invention, the participating nodes are all, or portion, of the nodes of the distributed system that are not the primary node. For example, after a node of the distributed system is selected as the primary node, the remaining nodes may be considered participating nodes.

In one or more embodiments of the invention, the remaining node configurations are the node configurations that were not applied to the primary node.

In one or more embodiments of the invention, the remaining node configurations are applied to the participating nodes of the distributed system by sending the remaining node configurations to a node configuration manager that enforces configurations on the distributed system. In turn, the node configuration manager may enforce the remaining node configurations on the participating nodes of the distributed system.

Thus, via steps 208, 210, and 212, a logical configuration manager may orchestrate application node configurations to both primary and participating nodes of a distributed system.

The method may end following step 212.

As discussed with respect to step 204, the method may end following that step. If the method ends following step 204, the configuration specification may not include a logical portion. In such a scenario, the logical configuration manager may send the configuration specification to a node configuration manager. In turn, the node configuration manager may generate node configurations and enforce the node configurations on nodes of the distributed system. For example, the node configuration manager may include functionality to generate node configurations for host level configurations but not for logical configurations.

Further, as discussed with respect to step 210, the method may end following step 210 if application of the node configuration to the primary node was unsuccessful. If application of the node configuration to the primary node was unsuccessful, logical configuration manager may notify any number of entities of the failure. For example, the logical configuration manager may notify an administrator of the distributed system.

FIG. 2.2 shows a flowchart of a method in accordance with one or more embodiments of the invention. The method depicted in FIG. 2.2 may be used to generate node configurations for nodes of a distributed system in accordance with one or more embodiments of the invention. The method shown in FIG. 2.2 may be performed by, for example, a logical configuration manager (e.g., 120, FIG. 1.1). Other components of the system illustrated in FIG. 1.1 may perform the method of FIG. 2.2 without departing from the invention.

In step 220, a node configuration manager that manages the distributed system is identified.

In one or more embodiments of the invention, the node configuration manager that manages the distributed system enforces node configurations on nodes of the distributed system. The node configuration manager may manage the nodes of any number of distributed systems.

In step 222, a manifest is generated based on a type of the node configuration manager.

In one or more embodiments of the invention, the manifest is based on an architecture used by the node configuration manager to enforce node configurations. The architecture may utilize manifests in a particular format for enforcement purposes. Different architectures may utilize manifests in different formats and/or include different types of information.

In one or more embodiments of the invention, the manifest reflects a particular format utilized by an architecture of the node configuration manager. For example, the manifest may include descriptors or other forms of markup language understood by the node configuration manager.

In step 224, for each node of the distributed system: (i) a copy of the manifest is generated, (ii) a copy of the manifest is populated based on the configuration specification to obtain a populated manifest, and (iii) the populated manifest is added to the node configurations for the distributed system.

In one or more embodiments of the invention, the manifest is populated by adding at least one host level configuration and one logical configuration.

The logical configuration may be a virtualized resource associated with the distributed system. The virtual resource may not be associated with any of the nodes of the distributed system. The logical configuration may be a virtual machine associated with the distributed system. Virtual machine may not be associated with any of the nodes of the distributed system.

The host level configuration may specify an operating system associated with one node of the distributed system. The host level configuration may specify a bare metal configuration associated with one node of the distributed system. The host level configuration may specify network configuration information associated with one node of the distributed system. The host level configuration may specify network command/control information associated with one node of the distributed system. The command/control information may be, for example, network quality of service settings or firewall settings.

While the host level configuration and logical configuration have been described by specific examples, the host level configuration and logical configuration may specify different configurations than those used above without departing from the invention.

The method may end following step 224.

By utilizing the methods illustrated in FIGS. 2.1-2.2, embodiments of the invention may enforce a logical configuration on a distributed system. By doing so, the distributed system may be placed in the state for the distributed system supports one or more logical entities such as, for example, virtualized resources, virtual machines, applications, or other logical entities. The logical entities supported by the distributed system may only be associated with the distributed system and not any particular node of the distributed system.

As discussed above, node configuration managers may monitor configurations of nodes of distributed systems. FIG. 3 shows a method that may be performed by the system of FIG. 1.1

FIG. 3 shows a flowchart of a method in accordance with one or more embodiments of the invention. The method depicted in FIG. 3 may be used to monitor configurations of nodes of a distributed system in accordance with one or more embodiments of the invention. The method shown in FIG. 3 may be performed by, for example, a node configuration manager (e.g., 110, FIG. 1.1). Other components of the system illustrated in FIG. 1.1 may perform the method of FIG. 3 without departing from the invention.

In step 300, a change to a node of a distributed system is obtained.

In one or more embodiments of the invention, the change is obtained from an agent hosted by the node of the distributed system. The agent may proactively monitor the configuration of the node. The change obtained in step 300 may be a change to a configuration of the node. The change to the configuration may be, for example, a reduction or increase in a computing resource of the node. The change may be other types of changes to the configuration of the node without departing from the invention.

In step 302, a configuration of the node after the change is obtained.

In one or more embodiments of the invention, the configuration of the node is obtained by sending a request to an agent hosted by the node. In response to the request, the agent may obtain and send a copy of the configuration of the node.

In step 304, the configuration of the node is compared to a node configuration that was generated based on, in part, a logical configuration for the distributed system to determine a configuration compliance state of the node.

In one or more embodiments of the invention, the node configuration that was generated based on, in part, the logical configuration is similar to the node configuration described with respect to FIG. 1.6.

In one or more embodiments of the invention, the comparison determines whether the configuration of the node exceeds minimum requirements specified by the node configuration. For example, the node configuration may specify a minimum quantity of computing resources. If the configuration of the node does not exceed the minimum quantity of computing resources specified by the node configuration the compliance state of the node may be determined to be noncompliant. In contrast, if the configuration of the node does exceed the minimum quantity of computing resources specified by the node configuration, the compliance state of the node may be determined to be compliant. The node configuration may specify any number/type of characteristics or thresholds that must be met by an actual configuration of the node for the node to be considered to be in a compliant state.

In step 306, it is determined whether the node is in a compliant state based on the compliance state determined in step 304. If the node is in a compliant state, the method may end following step 306. If the node is in a non-compliant state, the method may proceed to step 308 following step 306.

In step 308, the node is remediated.

In one or more embodiments of the invention, the node is remediated by sending a notification of the noncompliant state of the node to an administrator.

In one or more embodiments of the invention, the node is remediated by adding or allocating computing resources to the node. For example, shared memory resources may be allocated to the node from another node.

In one or more embodiments of the invention, the node is remediated by instantiating a logical entity in the node. For example, the logical entity may be a virtualized resource or a virtual machine. The logical entity may be other types of resources without departing from the invention.

In one or more embodiments of the invention, remediating the node places the node in a compliant state. For example, when automated addition of computing resources to the node places the node in a compliant state, the remediation thereby places the node in the compliant state.

In one or more embodiments of the invention, remediating the node does not place the node in a compliant state. For example, the node may be in operable or otherwise nonresponsive and, consequently, may not be remediated. In such scenarios, notifications or other messages may be sent to administrators of the distributed system so that the non-compliance of the node may be further investigated or logged.

The method may end following step 308.

Figure 4:
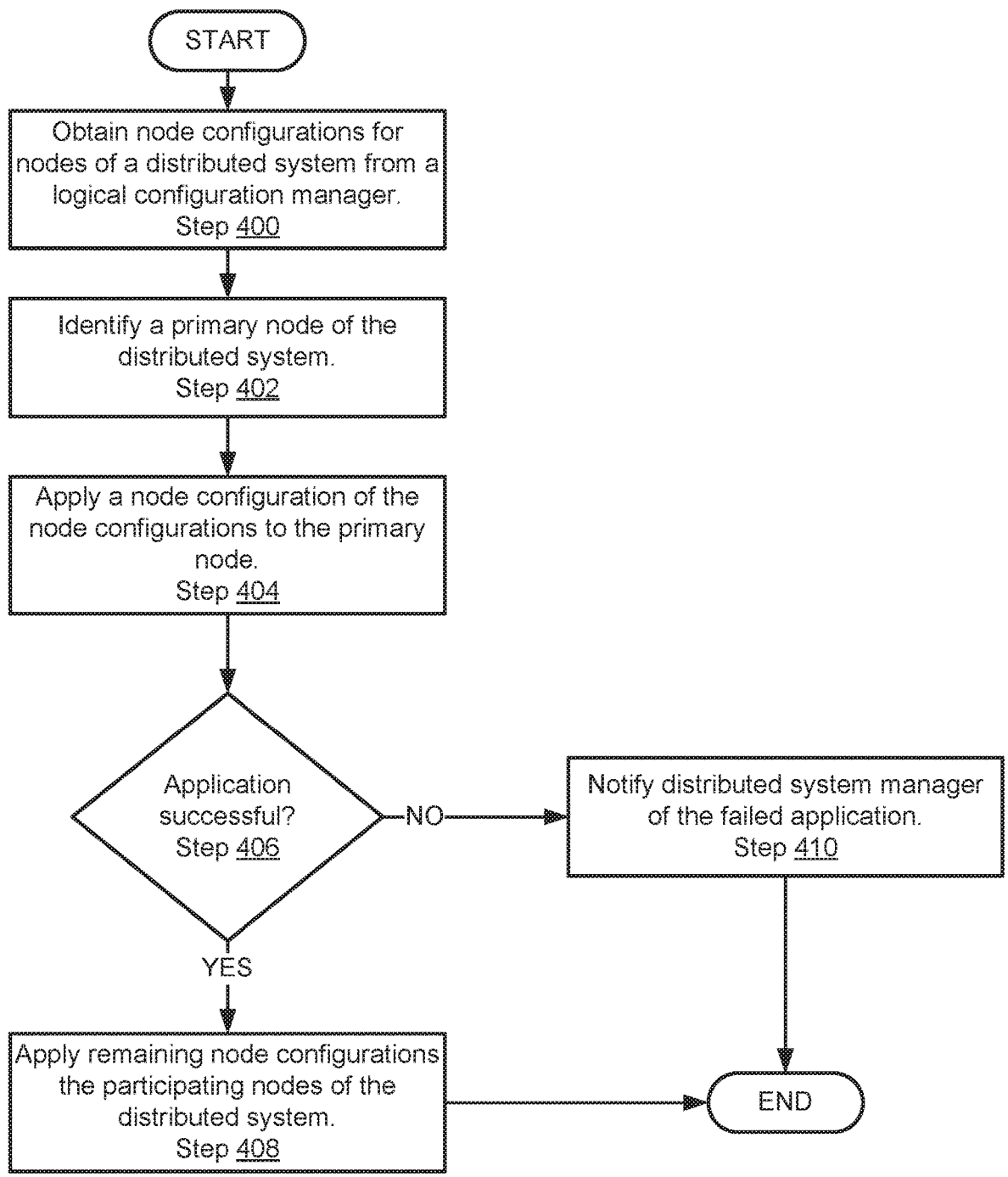
FIG. 4 shows a flowchart of a method of enforcing node configuration on a distributed system in accordance with one or more embodiments of the invention.

As discussed above, node configuration managers may also enforce configurations on nodes in addition to monitoring configurations of nodes. FIG. 4 shows a method that may be performed at the system of FIG. 1.1.

FIG. 4 shows a flowchart of a method in accordance with one or more embodiments of the invention. The method depicted in FIG. 4 may be used to enforce configurations on nodes of a distributed system in accordance with one or more embodiments of the invention. The method shown in FIG. 3 may be performed by, for example, a node configuration manager (e.g., 110, FIG. 1.1). Other components of the system illustrated in FIG. 1.1 may perform the method of FIG. 3 without departing from the invention.

In step 400, node configurations for nodes of a distributed system are obtained from a logical configuration manager.

In one or more embodiments of the invention, the node configurations include logical configurations that, when enforced on the nodes, give rise to a logical entity supported by the distributed system.

In step 402, a primary node of the distributed system is identified.

In one or more embodiments of the invention, the primary node is a first node of the distributed system to which a node configuration will be applied. The primary node may be selected from the nodes of the distributed system using any method without departing from the invention. For example, the primary node may be arbitrarily selected from the nodes of the distributed system.

In step 404, a node configuration of the node configurations is applied to the primary node.

In one or more embodiments of the invention, the node configuration is applied to the primary node by sending commands to an agent hosted by the primary node. The commands may modify a configuration of the primary node to match the node configuration.

In step 406, it is determined whether application of the node configuration of step 404 was successful. If application of the node configuration was unsuccessful the method scratch that, the method may proceed to step 410. If application of the node configuration was successful, the method may proceed to step 408.

In step 408, the remaining node configurations are applied to the participating nodes of the distributed system.

In one or more embodiments of the invention, the participating nodes are all, or portion, of the nodes of the distributed system that are not the primary node. Only a portion of the nodes of the distributed system that are not the primary node may be used as the participating nodes when some of the nodes of the distributed system are reserved for other purposes other than providing the functionality of the distributed system. For example, some nodes may be reserved for redundancy purposes to take place of nodes that may fail for any number of reasons. These reserved nodes may then be reconfigured to take the place of the failed nodes.

In one or more embodiments of the invention, the remaining node configurations are applied to the participating nodes by sending commands to agents of the respective participating nodes. By doing so, the respective agents may modify the configuration of the nodes hosting the agents to match that of the configurations specified by the remaining node configurations.

The method may end following step 408.

Returning to step 406, the method may proceed to step 410 following step 406 when application of the node configuration to the primary node was unsuccessful.

In step 410, a distributed system manager is notified of the failed application. In other words, when application of a node configuration to a primary node fails, the configuration may be aborted and an administrator, or other entity, may be notified of the failure.

The method may end following step 410.

In some embodiments of the invention, the primary node may be remediated as described with respect to step 308 of FIG. 3 before the configuration is aborted in steps 406 and 410. If the remediation is successful, the method may proceed to step 408.

To further clarify aspects of the invention, a non-limiting example is provided in FIGS. 5.1-5.4.

Example

Consider a scenario as illustrated in FIG. 5.1 in which a distributed system (500) is in a pre-configuration state. In the pre-configuration state, each node (502, 504, 506) of the distributed system (500) is also in a pre-configuration state. In the pre-configuration state, the nodes of the distributed system (500) may not be able to work together to provide the services of the distributed system (500) that the distributed system provides after configuration of its nodes.

At a first point in time, a logical configuration manager (520) receives a request to configure the distributed system (500). In response to the request, the logical configuration manager (520) identifies a node configuration manager (510) that enforces configurations on the nodes of the distributed system (500). Using the identity of the node configuration manager (510) and a configuration specification for the distributed system (500), the logical configuration manager (520) generates node configurations as illustrated in FIG. 5.2.

As seen from FIG. 5.2, the generated node configurations (522) include node configurations (524, 526, 528) for each node of the distributed system. Each of the node configurations may include at least one logical configuration in addition to host level configurations. The node configurations may also be in a format determined using the identity of the node configuration manager.

After generation, the generated node configurations (522) are sent to the node configuration manager (510) as illustrated in FIG. 5.3. In turn, the generated node configurations are enforced on the nodes by first selecting a primary node. In this example, the first node (502, FIG. 5.1) is selected as the primary node. One of the node configurations are applied to the first node to obtain a first configured node (503).

After verifying successful application of the node configuration to obtain the first configured node (503), the remaining node configurations are applied to the second pre-configuration node (504) and the third pre-configuration node (506). By applying the remaining node configurations, a second configured node (505) and third configured node (507) are obtained as shown in FIG. 5.4.

By obtaining the configured nodes (e.g., 503, 505, 507), the distributed system (500) is placed in a state where it may provide its predetermined services. Specifically, the nodes cooperatively provide the services of the distributed system (500).

End of Example

Any of the components of FIG. 1.1 may be implemented as distributed computing devices. As used herein, a distributed computing device refers to functionality provided by a logical device that utilizes the computing resources of one or more separate and/or distinct computing devices.

Figure 6:
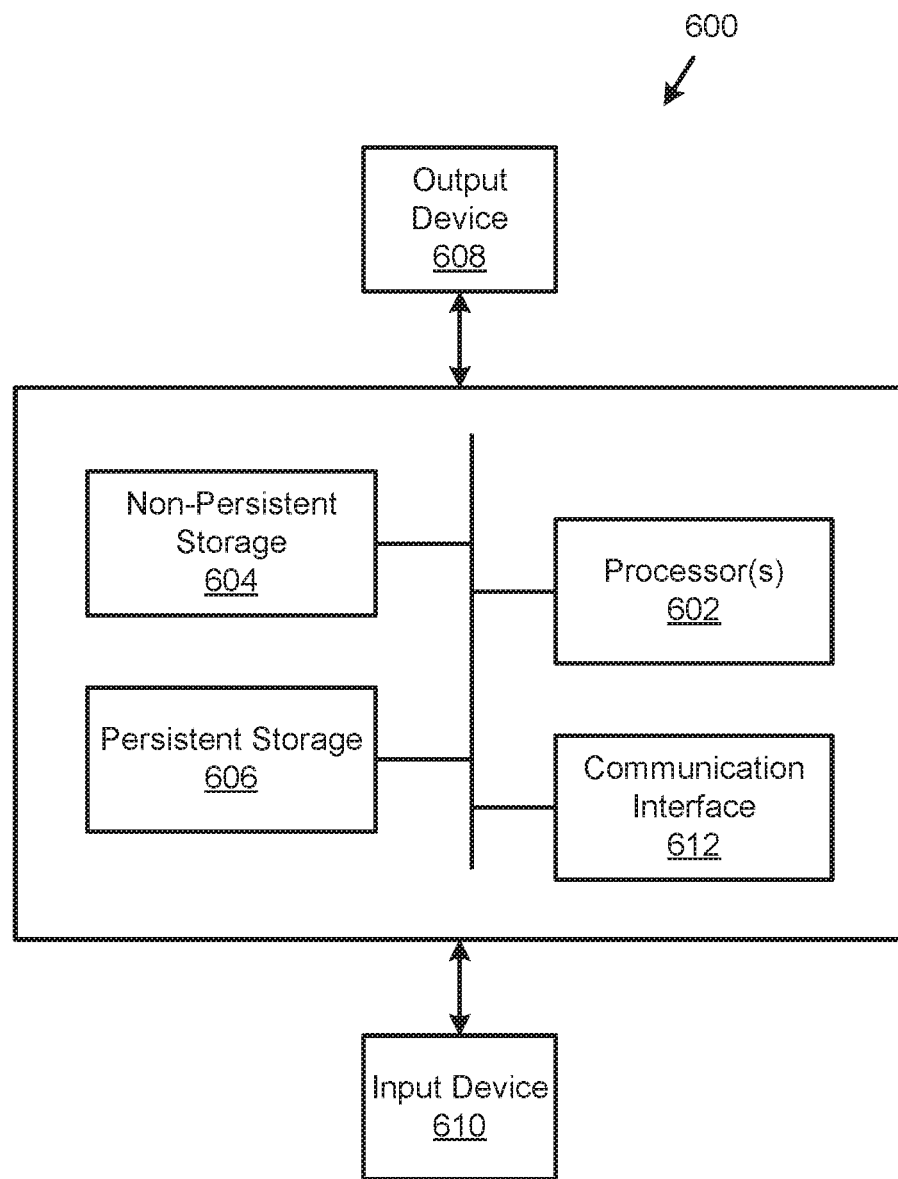
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may improve distributed system technology. Specifically, embodiments of the invention may improve the reliability of distributed systems by ensuring that each node of the distributed system is configured in a manner that supports the services of the distributed system. For example, embodiments of the invention may enable logical configurations to be applied to nodes of a distributed system. In this manner, embodiments of the invention may enable an automated configuration process for distributed system to give rise to logical entities such as virtualized resources or virtual machines. By doing so, embodiments of the invention may improve distributed system technology by providing for logical configurations to be enforced, rather than mere node level configurations that do not support logical configurations provided by contemporary methods.

Thus, embodiments of the invention directly address problems arising due to the nature of modern technological environments of distributed systems. Specifically, as distributed systems increase in their use and general complexity, configuration of distributed systems is becoming progressively more difficult and places an extraordinary cognitive burden on administrators. In particular, where logical configuration is required to be enforced across hundreds, or thousands, of nodes, the burden on administrator may cause nodes of the distributed system to be misconfigured if the burden is shouldered by the administrator. Embodiments of the invention may address this, and other problems, by providing a method and system that enables for automated logical configurations of distributed systems.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A logical configuration manager, comprising:
    persistent storage storing a configuration specification for a distributed system; and
    a node configuration generator programmed to:
        make a first determination that the configuration specification includes a logical portion for the distributed system;
        in response to the first determination:
            generate node configurations for nodes of the distributed system based, in part, on the logical portion; and
            orchestrate application of the node configurations to the nodes of the distributed system,
        wherein orchestration of the application of the node configurations to the nodes of the distributed system places the distributed system in a state that complies with the logical portion of the configuration specification,
        wherein generating the node configurations for the nodes of the distributed system based, in part, on the logical portion comprises:
            identifying a node configuration manager that manages the distributed system;
            generating a manifest based on a type of the node configuration manager; and
            for each node of the distributed system:
                generating a copy of the manifest;
                populating the copy of the manifest based on the configuration specification to obtain a respective populated manifest; and
                adding the respective populated manifest to the node configurations for the distributed system.

2. The logical configuration manager of claim 1, wherein orchestrating the application of the node configurations to the nodes of the distributed system comprises:
    providing the node configurations to the node configuration manager that enforces the node configurations on the distributed system.

3. The logical configuration manager of claim 1, wherein orchestrating the application of the node configurations to the nodes of the distributed system comprises:
    applying a first node configuration of the node configurations to a primary node of the distributed system;
    making a second determination that applying the first node configuration placed the primary node in a logical configuration compliant node state; and
    in response to the second determination:
        applying the first node configuration to participating nodes of the distributed system.

4. The logical configuration manager of claim 1, wherein each node of the distributed system is in a pre-configuration state prior to the first determination.

5. The logical configuration manager of claim 1, wherein populating the copy of the manifest based on the configuration specification to obtain the respective populated manifest comprises:
    adding a host level configuration; and
    adding a logical configuration.

6. The logical configuration manager of claim 5, wherein the logical configuration specifies a virtualized resource associated with the distributed system, wherein the virtualized resource is not associated with any of the nodes of the distributed system.

7. The logical configuration manager of claim 5, wherein the logical configuration specifies a virtual machine associated with the distributed system, wherein the virtualized machine is not associated with any of the nodes of the distributed system.

8. The logical configuration manager of claim 5, wherein the host level configuration specifies an operating system associated with one node of the distributed system.

9. The logical configuration manager of claim 5, wherein the host level configuration specifies a bare metal configuration associated with one node of the distributed system.

10. The logical configuration manager of claim 5, wherein the host level configuration specifies network configuration information associated with one node of the distributed system.

11. The logical configuration manager of claim 5, wherein the host level configuration specifies network command/control information associated with one node of the distributed system.

12. The logical configuration manager of claim 1, wherein the configuration specification comprises:
    a node configuration manager identifier of the node configuration manager that manages the distributed system;
    input parameters comprising and internet protocol address of the distributed system;
    definitions that specify the logical portion; and
    a configuration identifier associated with the distributed system.

13. The logical configuration manager of claim 1, wherein complying with the logical portion of the configuration specification comprises:
    hosting, by the distributed system, at least one selected from a group consisting of a virtualized resource and a virtual machine.

14. The logical configuration manager of claim 13, wherein none from the group are associated with any of the nodes of the distributed system.

15. A method for configuring a distributed system, comprising:
    making a first determination that a configuration specification includes a logical portion for the distributed system;
    in response to the first determination:
        generating node configurations for nodes of the distributed system based, in part, on the logical portion; and
        orchestrating application of the node configurations to the nodes of the distributed system,
    wherein orchestrating the application of the node configurations to the nodes of the distributed system places the distributed system in a state that complies with the logical portion of the configuration specification, wherein generating the node configurations for the nodes of the distributed system based, in part, on the logical portion comprises:
  identifying a node configuration manager that manages the distributed system;
  generating a manifest based on a type of the node configuration manager; and
  for each node of the distributed system:
    generating a copy of the manifest;
    populating the copy of the manifest based on the configuration specification to obtain a respective populated manifest; and
    adding the respective populated manifest to the node configurations for the distributed system.

16. The method of claim 15, wherein orchestrating the application of the node configurations to the nodes of the distributed system comprises:
  providing, by a logical configuration manager, the node configurations to the node configuration manager that enforces the node configurations on the distributed system.

17. The method of claim 15, wherein orchestrating the application of the node configurations to the nodes of the distributed system comprises:
  applying a first node configuration of the node configurations to a primary node of the distributed system;
  making a second determination that applying the first node configuration placed the primary node in a logical configuration compliant node state; and
  in response to the second determination:
    applying the first node configuration to participating nodes of the distributed system.

18. A non-transitory computer readable medium comprising computer readable program code, which when executed by a computer processor enables the computer processor to perform a method for configuring a distributed system, the method comprising:
  making a first determination that a configuration specification includes a logical portion for the distributed system;
  in response to the first determination:
    generating node configurations for nodes of the distributed system based, in part, on the logical portion; and
    orchestrating application of the node configurations to the nodes of the distributed system,
  wherein orchestrating the application of the node configurations to the nodes of the distributed system places the distributed system in a state that complies with the logical portion of the configuration specification,
  wherein generating the node configurations for the nodes of the distributed system based, in part, on the logical portion comprises:
    identifying a node configuration manager that manages the distributed system;
    generating a manifest based on a type of the node configuration manager; and
    for each node of the distributed system:
      generating a copy of the manifest;
      populating the copy of the manifest based on the configuration specification to obtain a respective populated manifest; and
      adding the respective populated manifest to the node configurations for the distributed system.

19. The non-transitory computer readable medium of claim 18, wherein orchestrating the application of the node configurations to the nodes of the distributed system comprises:
  providing, by a logical configuration manager, the node configurations to the node configuration manager that enforces the node configurations on the distributed system.

* * * * *